(12) United States Patent
Bogle

(10) Patent No.: US 10,099,859 B2
(45) Date of Patent: Oct. 16, 2018

(54) SELF-STACKING SPIRAL MODULAR PLASTIC CONVEYOR BELT WITH INTERMEDIATE SUPPORT

(71) Applicant: Laitram, L.L.C., Harahan, LA (US)

(72) Inventor: David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/560,334

(22) PCT Filed: Apr. 14, 2016

(86) PCT No.: PCT/US2016/027447
§ 371 (c)(1),
(2) Date: Sep. 21, 2017

(87) PCT Pub. No.: WO2016/168407
PCT Pub. Date: Oct. 20, 2016

(65) Prior Publication Data
US 2018/0072503 A1    Mar. 15, 2018

Related U.S. Application Data

(60) Provisional application No. 62/147,959, filed on Apr. 15, 2015.

(51) Int. Cl.
*B65G 21/18*  (2006.01)
*B65G 17/40*  (2006.01)
*B65G 17/38*  (2006.01)

(52) U.S. Cl.
CPC .......... *B65G 17/40* (2013.01); *B65G 17/385* (2013.01); *B65G 21/18* (2013.01); *B65G 2207/24* (2013.01)

(58) Field of Classification Search
CPC .... B65G 15/40; B65G 21/18; B65G 2207/24; B65G 17/385
USPC ......................................................... 198/778
See application file for complete search history.

(56) References Cited

U.S. PATENT DOCUMENTS

| | | | |
|---|---|---|---|
| 4,448,301 A | 5/1984 | Alger | |
| 5,558,208 A | 9/1996 | Kucharski | |
| 7,228,959 B1 * | 6/2007 | Harrison | B65G 17/086 198/778 |
| 7,494,006 B2 | 2/2009 | Knott et al. | |
| 8,371,437 B2 * | 2/2013 | Menke | B65G 17/08 198/850 |
| 2004/0011627 A1 | 1/2004 | Palmaer et al. | |
| 2006/0266623 A1 * | 11/2006 | Heber | B65G 17/064 198/778 |
| 2011/0000767 A1 | 1/2011 | Cornelissen et al. | |
| 2013/0270074 A1 * | 10/2013 | Malmberg | B65G 17/063 198/850 |

(Continued)

FOREIGN PATENT DOCUMENTS

| | | | |
|---|---|---|---|
| EP | 1422171 B1 | 7/2010 | |
| FR | 2684650 A1 * | 6/1993 | ............. B65G 21/18 |

*Primary Examiner* — Mark A Deuble
(74) *Attorney, Agent, or Firm* — Catherine M. Bishop

(57) ABSTRACT

A modular spiral belt constructed of a series of hingedly interconnected belt modules arranged in a helical stack. The modular spiral belt includes outer side plates, inner side plates and intermediate attachment members. The intermediate attachment members provide support for the conveyor belt to prevent sagging in an intermediate region.

10 Claims, 3 Drawing Sheets

(56) References Cited

U.S. PATENT DOCUMENTS

2014/0021020 A1   1/2014   Bogle et al.

* cited by examiner

SELF-STACKING SPIRAL MODULAR PLASTIC CONVEYOR BELT WITH INTERMEDIATE SUPPORT

RELATED APPLICATIONS

This application claims priority to US Provisional Patent Application No. 62/147,959, filed Apr. 15, 2015 and entitled "Self-Stacking Spiral Modular Plastic Conveyor Belt with Intermediate Support" the contents of which are herein incorporated by reference.

BACKGROUND OF THE INVENTION

The invention relates generally to power-driven conveyors and, more particularly, to modular plastic conveyor belts suitable for following curved paths.

Conveyor belts are typically used for conveying bulk material, such as foodstuffs or other materials, that must be transported through a cooled or refrigerated environment. Typical conveyor belts have the advantage that relatively little energy is required for transporting the bulk material across horizontal surfaces. The conveyance of bulk material, however, is limited by such systems to horizontal routes or to routes with only relatively small inclines. To overcome greater heights or inclines, it is necessary to transfer the bulk material to another conveyor system, for example, a bucket chain conveyor. In the transport of material to be refrigerated, it is often desirable to maximize the time of transport within the cooled environment. It is desirable to provide a conveyor belt system that transports goods along an extended path.

Spiral conveyor belts, in which a conveyor belt follows a helical path, are used in certain applications because they allow for an extended path with minimal floor space. For example, spiral conveyor belts are often used in freezers and ovens to provide a long conveying path with a small footprint.

Self-stacking spiral belts are used to form a helical path with minimal framing. A self-stacking conveyor belt uses side plates or side guards coupled to the side edges of the conveyor belt to form a self-supporting stack. The belt travels in a straight path until it enters a spiral or helical configuration. When aligned in the helical configuration, the lower tier of the belt is supported by a frame or drive system, while the upper tiers are supported by the lower tiers. The interface between adjacent tiers is designed to keep the belt supported and laterally aligned. The tiers are laterally aligned by resting the upper edge of a lower side guard against the bottom side edge of the belt in a tier above.

Since self-stacking spiral belts lack carryways in the helical portion, belts that are wider in length may tend to sag in the middle, due to lack of support. The sagging impedes operation of the belt and may affect the conveyed product.

SUMMARY OF THE INVENTION

A spiral conveyor belt transports articles along a substantially helical path. One version of a spiral conveyor belt embodying features of the invention employs an intermediate support member. The intermediate support member is coupled to a conveyor belt module in an intermediate portion and contacts the bottom of a conveyor belt module in a tier above to provide support.

According to one aspect, a spiral conveyor belt comprises a plurality of modules hingedly connected together forming a helix, a plurality of side plates coupled to an interior portion of the helix, a plurality of side plates coupled to an exterior portion of the helix, and a first attachment member coupled to an intermediate portion of a first module. The first attachment member has a body extending up from the first module and contacting a bottom surface of a second module above the first module.

According to another aspect, a spiral conveyor comprises a self-stacking conveyor belt having a plurality of modules with side plates hingedly connected together to form a helix having a plurality of tiers, wherein the side plates of a first tier contact and support a second tier above the first tier, and an intermediate attachment member. The intermediate attachment member extends between a top surface of a first module in the first tier and a bottom surface of a second module in the second tier to support the second module in the second tier.

According to another aspect, a spiral conveyor comprises a plurality of modules hingedly connected together forming a helix. A first module of the plurality of modules comprises a module body, hinge elements extending from first and second ends of the module body to connect the first module to adjacent modules in the helix, an inner side plate extending up from an inner edge of the module body and an outer side plate extending up from an outer edge of the module body. A second module in the helix is disposed in a tier below the first module. The second module comprises a module body, hinge elements extending from first and second ends of the module body to connect the second module to adjacent modules in the helix, an inner side plate extending up from an inner edge of the module body, an outer side plate extending up from an outer edge of the module body and an intermediate attachment member extending up from an intermediate point on the module body between the inner side plate and the outer side plate. The intermediate attachment member contacts a bottom surface of the first module to support the first module.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

Figure 1:
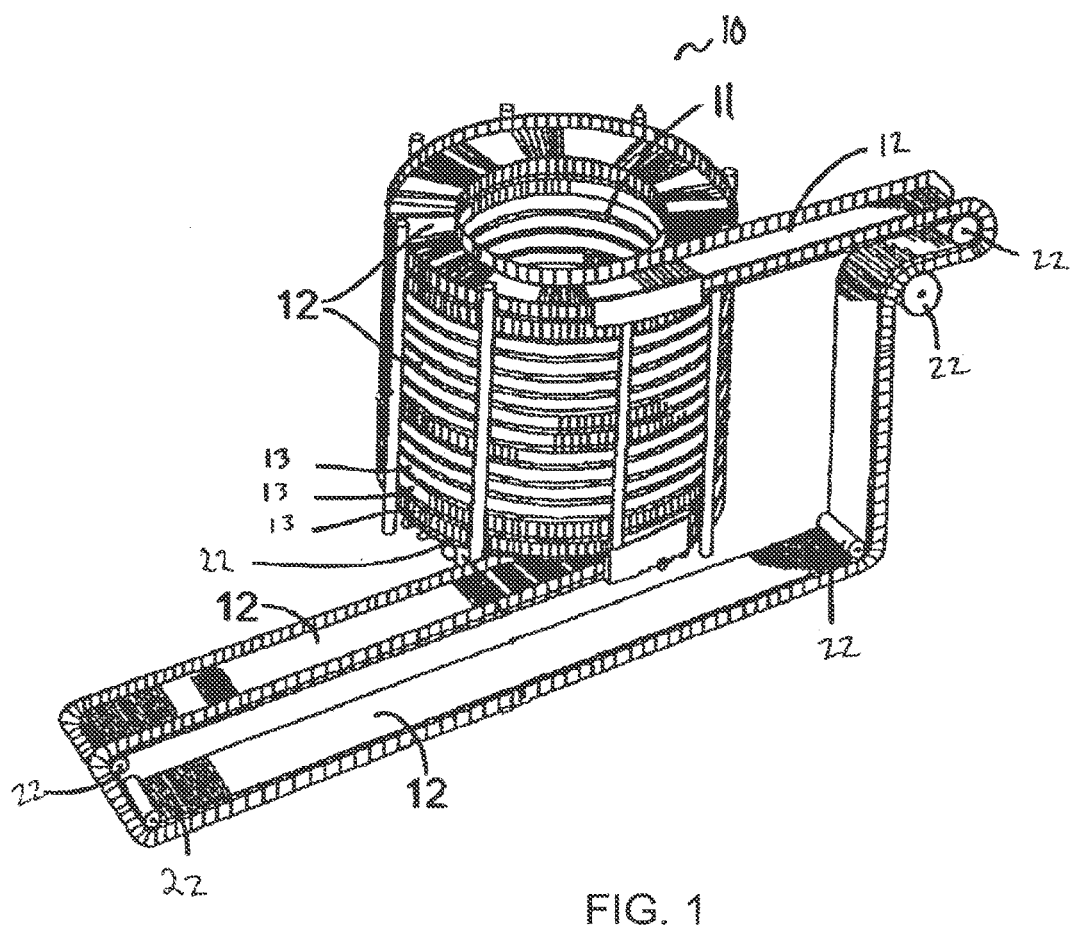
FIG. 1 is a schematic view of a spiral conveyor belt system according to an embodiment of the present invention.

A self-stacking spiral conveyor belt system is shown schematically in FIG. 1. The spiral belt conveyor 10 conveys articles vertically along a substantially helical path. The spiral belt conveyor includes a conveyor belt 12 arranged in a helical stack 11, comprising tiers 13 of the belt stacked serially and directly on one another. The belt travels around various take-up, idle, and feed sprockets 22 as it makes it way from the exit at the top of the stack back to the entrance at the bottom. Alternatively, the belt may enter at the top and exit at the bottom of the stack. The spiral belt conveyor 10 may be used within a refrigerator, cooler, for example, providing the articles being conveyed with an extended route for cooling, or with a heating system for baking or heating products, or in any suitable application.

Figure 2:
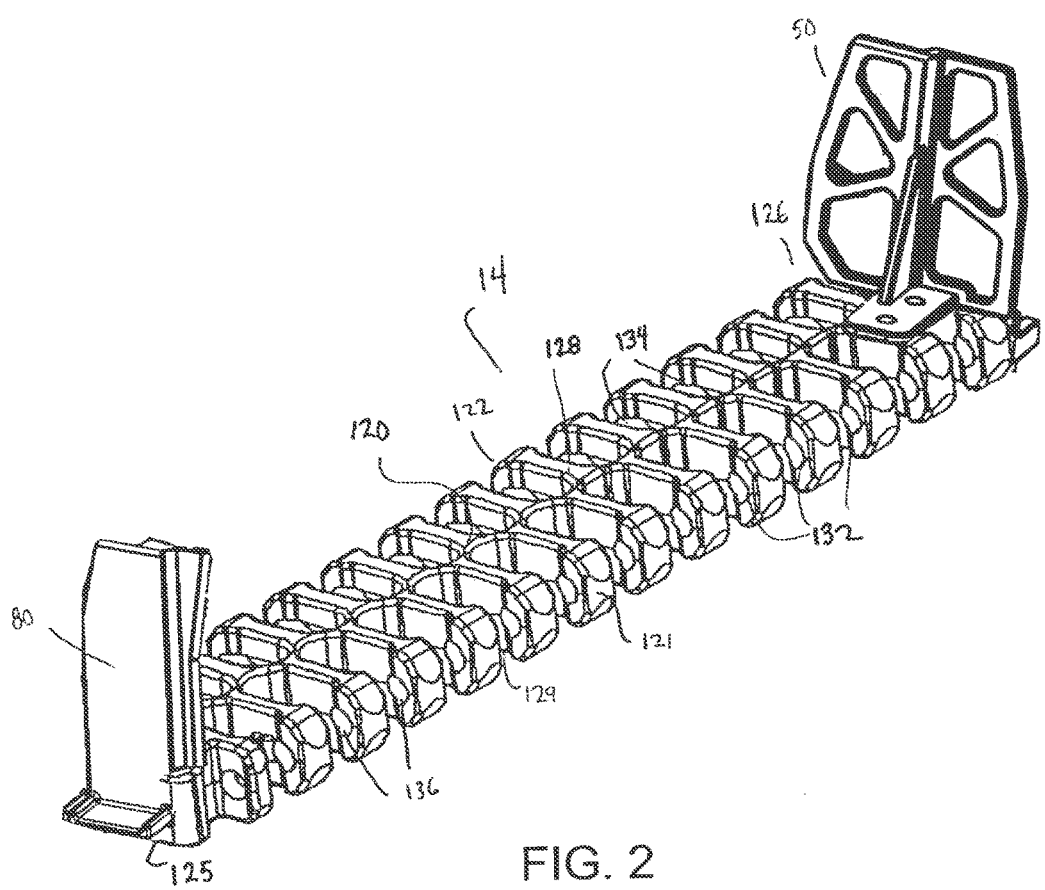
FIG. 2 illustrates a module for a spiral conveyor belt including side plates and an intermediate support according to an embodiment of the present invention.

The illustrative conveyor belt 12 is constructed of a series of rows, each comprising one or more belt modules 14, as shown in FIG. 2. A row may comprise a single module spanning the width of the belt or a number of side-by-side modules. The illustrative belt module 14 includes a central portion 120 that extends longitudinally in a direction of belt travel from a first end 121 to a second end 122, laterally from an inner edge 125 to an outer edge 126 and in thickness from a top side 128 to a bottom side 129. A first set 132 of hinge elements is formed along the first end 121 of the module; a second set 134, along the second end 122. Rod openings 136 in the hinge elements align to form lateral passageways through the first and second sets of hinge elements. The passageways admit a hinge rod (not shown) that connects a row of similar side-by-side modules to an adjacent row of modules into a conveyor belt. The first set of hinge elements 132 along a row of modules interleaves with the second set of hinge elements 134 of a longitudinally adjacent row to form a hinge with the hinge rod. The rod openings 136 through one or both of the leading and trailing hinge elements may be elongated in the direction of belt travel to allow the belt to collapse at the inside of a turn, while the outside edge expands.

The belt modules 14 are preferably injection molded out of a thermoplastic material, such as polyethylene, polypropylene, acetal, nylon, or a composite resin.

The belt modules may have any suitable configuration and are not limited to the illustrative embodiment.

Figure 3:
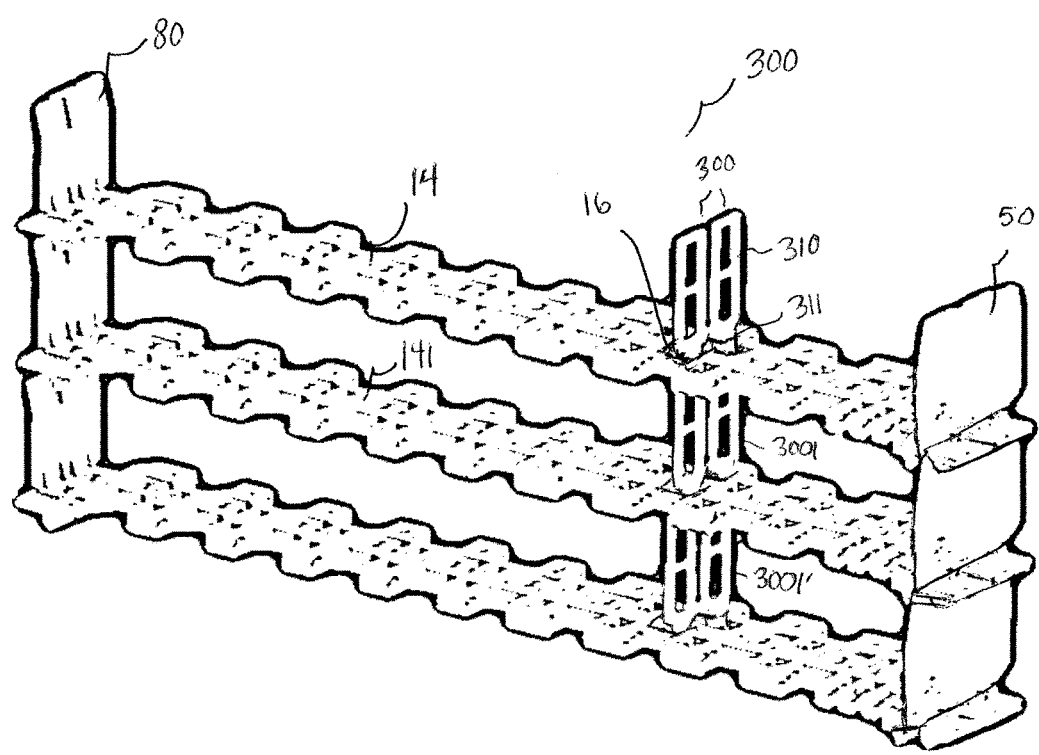
FIG. 3 is an outside view of an outer portion of the spiral conveyor belt including intermediate support structure.

Side plates 50, 80 extend from each side edge of the conveyor belt row. In the illustrative embodiment, a single module 14 spans an entire row, with side plates 50, 80 connected to each side of the module. Alternatively, a row of the conveyor belt may comprise a plurality of modules arranged side-by-side, with an inner side plate 80 coupled to the inner side edge 125 of an inner module and an outer side plate 50 coupled to the outer side edge 126 of an outer module. The side plates may be integrally formed with the module, or may be coupled to the module using screws, bolts, ultrasonic welding, a snap-fit connection or other suitable fastening means. The side plates facilitate stacking of the belt in the helical configuration, as each module rests on a side plate on a lower tier, as shown in FIG. 3. Each side plate may releasable engage a portion of the conveyor belt above it and/or below it. Alternatively, a frame may be used to configure the helix, with the side plates providing additional support or airflow direction.

One or more rows of the belt may also include an attachment member 300 that provides additional intermediate support to the stacked belt to prevent sagging. For example, as shown in FIG. 3, an attachment member 300 may be attached to a module 14 along an intermediate portion, between the inner edge of the belt and the outer edge of the belt. The attachment member also includes an interaction element for attaching the attachment member to the module. The illustrative attachment member 300 includes a body 310 extending from the conveying surface of a first, lower module to the bottom surface of a second, upper module. The body 310 contacts the upper module to provide additional support. Alternatively, the body may extend to just below the upper module to only contact the bottom surface of the module in the event of sagging. As shown, a lower attachment member 3001 coupled to a lower module 141 in an intermediate tier of the helix extends up from the top conveying surface of the module and contacts the bottom surface of a tier 14 in a tier above the intermediate tier.

The interaction element 311 may comprise a leg, protrusion or other device that is press fit into an opening of the belt module. In the illustrative embodiment, the interaction element 311 is press-fit into an opening 16 in the top surface of the belt module 14. Alternatively, the attachment member may be welded, screwed or otherwise locked to the module through any suitable attachment means known in the art.

The attachment member 300 may be disposed at any suitable intermediate location of a belt. In certain embodiments, an attachment member is provided at or near the lateral center of the conveyor belt, but the invention is not so limited. In addition, multiple attachment members may be used in different lateral locations to provide multiple points of support.

In one embodiment, the attachment member 300 forms a lane divider to divide the conveying surface into two or more lanes.

The attachment member may be solid or include one or more openings to permit air flow. For example, the illustrative attachment members 300 each include two openings formed by a frame in the body 310, but the invention is not so limited. The openings are not limited to the illustrative embodiment, and can have any suitable size, shape, location, orientation and configuration.

The illustrative conveyor belt portion includes two attachment members 300 in series between the front end and rear end of a module, though alternatively a single attachment member may be used in a particular lateral location, or more attachment members 300 may be used.

The attachment members 300 are oriented parallel with the side plates and the body of the attachment members extends along the direction of belt travel. However, the invention is not so limited, and the attachment members may have any suitable size, shape, orientation and configuration suitable for providing support to a conveyor belt module located above.

In another embodiment, an attachment member 300 extends down from a bottom surface of a first module towards the upper surface of a second module below the first module to provide intermediate support for the belt. For example, an attachment member 300 may have a top interaction element that is inserted into an opening in the bottom surface of the module, with the body of the attachment member extending down from the bottom surface towards the upper surface of a lower module.

The illustrative conveyor belt includes intermediate support members 300, 3001, 3001' that are aligned across the tiers and in the same lateral location on each module, though the invention is not so limited, and the intermediate support members 300 may be offset from each other.

Although the invention has been described in detail with reference to a few exemplary versions, other versions are possible. The scope of the claims is not meant to be limited to the versions described in detail.

What is claimed is:
1. A spiral conveyor belt comprising:
a plurality of modules hingedly connected together forming a helix;
a plurality of side plates coupled to an interior portion of the helix;
a plurality of side plates coupled to an exterior portion of the helix; and
a first attachment member coupled to an intermediate portion of a first module at or near the lateral center of the first module, the first attachment member having a body extending up from the first module and contacting a bottom surface of a second module above the first module.

2. The spiral conveyor of claim 1, further comprising a second attachment member coupled to the first module, the second attachment member placed in series with the first attachment member.

3. The spiral conveyor of claim 1, wherein the first attachment member includes at least one opening in the body to allow airflow therethrough.

4. The spiral conveyor of claim 1, wherein the first attachment member includes an interaction element for attaching the first attachment member to the first module.

5. The spiral conveyor of claim 1, wherein the first attachment member includes a protrusion press-fit into an opening in an upper surface of the first module.

6. A spiral conveyor, comprising:
   a self-stacking conveyor belt having a plurality of modules with side plates hingedly connected together to form a helix having a plurality of tiers, wherein the side plates of a first tier contact and support side plates in a second tier above the first tier, and
   an intermediate attachment member extending between a top conveying surface of a first module in the first tier to just below a bottom surface of a second module in the second tier to support the second module in the second tier in the event of sagging.

7. The spiral conveyor of claim 6, wherein the intermediate attachment member includes a lower protrusion press-fit into an opening in the top surface of the first module.

8. The spiral conveyor of claim 6, wherein the intermediate attachment member includes at least one opening to permit airflow therethrough.

9. The spiral conveyor of claim 6, further comprising a second intermediate attachment in series with the intermediate attachment member and extending between a top surface of a first module in the first tier and a bottom surface of a second module in a second tier to support the second module in the second tier.

10. A spiral conveyor belt comprising:
    a plurality of modules hingedly connected together forming a helix;
    a plurality of side plates coupled to an interior portion of the helix;
    a plurality of side plates coupled to an exterior portion of the helix;
    a first attachment member coupled to an intermediate portion of a first module, the first attachment member having a body extending parallel with the side plates along a direction of belt travel and up from a conveying surface towards a bottom surface of a second module above the first module; and
    a second attachment member coupled to the first module, the second attachment member placed in series with the first attachment member to divide the conveying surface into a plurality of lanes.

* * * * *